US011942291B2

(12) United States Patent
Choi

(10) Patent No.: US 11,942,291 B2
(45) Date of Patent: Mar. 26, 2024

(54) MOTION SENSING DEVICE FOR VACUUM CIRCUIT BREAKER AND VACUUM CIRCUIT BREAKER COMPRISING SAME

(71) Applicant: LS ELECTRIC CO., LTD., Anyang-si (KR)

(72) Inventor: Yong-Jin Choi, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 232 days.

(21) Appl. No.: 17/602,151

(22) PCT Filed: Mar. 9, 2020

(86) PCT No.: PCT/KR2020/003288
§ 371 (c)(1),
(2) Date: Oct. 7, 2021

(87) PCT Pub. No.: WO2020/209508
PCT Pub. Date: Oct. 15, 2020

(65) Prior Publication Data

US 2022/0148829 A1 May 12, 2022

(30) Foreign Application Priority Data

Apr. 8, 2019 (KR) ........................ 10-2019-0040648

(51) Int. Cl.
*H01H 33/662* (2006.01)
*H01H 33/664* (2006.01)
*H01H 33/666* (2006.01)

(52) U.S. Cl.
CPC ........ *H01H 33/664* (2013.01); *H01H 33/662* (2013.01); *H01H 33/6664* (2013.01)

(58) Field of Classification Search
CPC ............... H01H 33/664; H01H 33/662; H01H 33/6664; H01H 33/666; H01H 33/66261;
(Continued)

(56) References Cited

U.S. PATENT DOCUMENTS 4,056,722 A * 11/1977 Ray .......................... G01D 5/34
250/237 G
5,028,808 A * 7/1991 Sullivan ................. H01H 35/06
324/714

(Continued)

FOREIGN PATENT DOCUMENTS

JP H10475225 A 3/1992
JP H06215669 A 8/1994

(Continued)

OTHER PUBLICATIONS

Translation of JP06215669 (original document published Aug. 5, 1994) (Year: 1994).*

(Continued)

*Primary Examiner* — William A Bolton
(74) *Attorney, Agent, or Firm* — K&L Gates LLP

(57) ABSTRACT

The present disclosure relates to a motion sensing device for a vacuum circuit breaker and a vacuum circuit breaker comprising same. In the present disclosure, the motion sensing device for a vacuum circuit breaker is provided with a push rod assembly coupled to a movable electrode of a vacuum interrupter to elevate or lower the movable electrode, wherein the motion sensing device comprises: a sensor module spaced apart from the push rod assembly and arranged to face a side of a rod housing; and a sensing unit installed on a side of the push rod assembly and arranged to face the sensor module that senses the movement of the sensing unit.

16 Claims, 9 Drawing Sheets

(58) Field of Classification Search
CPC ... H01H 2033/6668; H01H 2033/6667; H01H 1/0015; H01H 2071/044; H01H 9/168; H01H 9/161; H01H 2009/164; H01H 11/0062; G01D 5/34; G01D 5/36
USPC ........ 218/123, 129, 140, 146, 118; 200/308, 200/311, 312, 52 R
See application file for complete search history.

(56) References Cited

U.S. PATENT DOCUMENTS

| | | | | |
|---|---|---|---|---|
| 8,952,826 | B2 * | 2/2015 | Leccia | H01H 33/6662<br>218/123 |
| 9,378,901 | B2 * | 6/2016 | Ashtekar | H01H 33/666 |
| 2007/0120048 | A1 * | 5/2007 | Lum | G01D 5/34<br>250/231.13 |
| 2014/0174898 | A1 * | 6/2014 | Matsunaga | H01H 9/16<br>200/308 |

FOREIGN PATENT DOCUMENTS

| | | | |
|---|---|---|---|
| JP | 2007149369 | A | 6/2007 |
| KR | 19990034356 | U | 8/1999 |
| KR | 101382301 | B1 | 4/2014 |
| KR | 20150113705 | A | 10/2015 |

OTHER PUBLICATIONS

International Search Report for related International Application No. PCT/KR2020/003288; dated Oct. 15, 2020; (5 pages).
Written Opinion for related International Application No. PCT/KR2020/003288; dated Oct. 15, 2020; (6 pages).
Office Action for related Korean Application No. 10-2019-0040648; dated Nov. 23, 2023; (9 pages).

* cited by examiner

MOTION SENSING DEVICE FOR VACUUM CIRCUIT BREAKER AND VACUUM CIRCUIT BREAKER COMPRISING SAME

CROSS-REFERENCE TO RELATED APPLICATIONS

This application is the National Stage filing under 35 U.S.C. 371 of International Application No. PCT/KR2020/003288, filed on Mar. 9, 2020, which claims the benefit of earlier filing date and right of priority to Korea utility model Application No. 10-2019-0040648 filed on Apr. 8, 2019, the contents of which are all hereby incorporated by reference herein in their entirety.

FIELD

The present disclosure relates to a movement sensing device for a vacuum circuit breaker capable of detecting abnormality and performance degradation of the vacuum circuit breaker, and a vacuum circuit breaker having the same.

BACKGROUND

A vacuum circuit breaker is an electrical protector that uses dielectric strength of the vacuum to protect load devices and lines from fault currents in an event of short circuits or ground faults occurring in electrical circuits.

The vacuum circuit breaker performs power transport control and power system protection. The vacuum circuit breaker has a large breaking capacity and high reliability and safety. Because the vacuum circuit breaker may be mounted in a small installation space, the breaker may be easily applied to a voltage range from a medium voltage to high voltage.

Hereinafter, a structure of a general vacuum circuit breaker will be briefly described.

FIG. 1 is a partial cross-sectional view showing a typical vacuum circuit breaker.

As shown in FIG. 1, a general vacuum circuit breaker 1 includes a main circuit 10 including a vacuum interrupter 10*a*, a push rod assembly 30 and a main shaft 50 for transmitting power to a contact of the vacuum interrupter 10*a*, and a mechanism assembly 70 that generates a driving force, is connected to the main shaft 50 and transmits the driving force.

The vacuum interrupter 10*a* includes a fixed electrode 14 fixedly disposed inside the insulating container 12, a movable electrode 16 that moves up and down and is disposed inside the insulating container 12, and a fixed contact 14*a* and a movable contact 16*a* disposed at ends of the fixed electrode 14 and the movable electrode 16, respectively.

The movable contact 16*a* contacts the fixed contact 14*a* (inserted state) or is removed from the fixed contact 14*a* (open or withdrawn state) under movement of the movable electrode 16. The movable electrode 16 is raised or lowered by the push rod assembly 30.

The push rod assembly 30 inserts or withdraws the movable electrode 16. The push rod assembly 30 is raised and lowered by the main shaft 50 that transmits the power generated from the mechanism assembly 70. The main shaft 50 has one end connected to the mechanism assembly 70, and the opposite end pivoting in one direction or the other direction to raise or lower the push rod assembly 30.

The vacuum circuit breaker 1 having the above structure measures an inserted or withdrawn timing of the movable contact 16*a* using a rotary sensor 52 mounted on the main shaft 50. The rotary sensor 52 measuring whether the movable contact 16*a* moves within a predetermined time duration may allow reliability of operation characteristics of the vacuum circuit breaker to be maintained.

However, a conventional rotary sensor has a fixed mechanical lifespan, which is very shorter, compared to a mechanical lifespan of the vacuum circuit breaker itself. Therefore, the measurement of the inserted or withdrawn timing using the rotary sensor depends on the mechanical lifespan of the rotary sensor, such that it is difficult to guarantee reliability of the sensor when the sensor has been used for a long time.

Therefore, in order to secure the reliability of the vacuum circuit breaker, it is necessary to develop a reliable method that may be used while maintaining the reliability thereof for long-term use thereof.

SUMMARY

A purpose of the present disclosure is to provide a movement sensing device for a vacuum circuit breaker capable of detecting abnormality and performance degradation of the vacuum circuit breaker, and a vacuum circuit breaker having the same.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

The present disclosure provides a movement sensing device for a vacuum circuit breaker, wherein the vacuum circuit breaker includes a push rod assembly coupled to a movable electrode of a vacuum interrupter to raise up or lower down the movable electrode, wherein the movement sensing device comprises: a sensor module spaced apart from the push rod assembly and facing toward one side of a rod housing; and a sensing target disposed on one side of the push rod assembly and facing toward the sensor module.

In one implementation of the device, the sensing target includes: a slit body coupled along a longitudinal direction to one side of the rod housing; a slit plate protruding outwardly along a longitudinal direction from an outer face of the slit body; and a plurality of sensed slits passing through the slit plate.

In one implementation of the device, the sensing target is disposed in a direction facing toward a plate face of the slit plate.

In one implementation of the device, the sensed slits are formed and spaced from each other by a preset spacing along a longitudinal direction of the slit plate.

In one implementation of the device, the slit body has a curved shape having a curvature corresponding to a curvature of an outer circumferential face of the rod housing.

In one implementation of the device, the slit body is inserted into an inner side of the rod housing, wherein while the slit body inserted into the rod housing, the slit plate protrudes out of the rod housing.

In one implementation of the device, the rod housing includes: a receiving slit extending through one portion of an outer circumferential face of the rod housing, wherein the receiving slit forms along a longitudinal direction of the rod housing, and has one open end in communication with an open end of the housing, wherein the slit body is inserted into the receiving slit; and a slit hole partially overlapping the receiving slit, wherein the slit hole is cut away along a longitudinal direction of the receiving slit, wherein the slit plate is exposed through the slit hole.

In one implementation of the device, a length of the receiving slit is larger than a length of the slit body.

In one implementation of the device, the push rod assembly further includes a fixing portion coupled to the open end of the rod housing to block the open end of the receiving slit, wherein the fixing portion has a hollow ring-shape such that the push rod is inserted into the fixing portion.

In one implementation of the device, the sensor module includes: a light-emitter facing toward the slit plate and emitting light toward the slit plate; a light-receiver disposed adjacent to the light-emitter and receiving light reflected from the slit plate; and a circuit coupled to the light-emitter and the light-receiver, and outputting an output signal based on an amount of light received by the light-receiver.

In one implementation of the device, the sensing target includes: a slit body coupled to one side of the rod housing and extending in a longitudinal direction thereof, wherein the slit body is inserted into the housing; and a plurality of protrusions protruding from an outer circumferential face of the slit body and arranged along the longitudinal direction of the slit body.

In one implementation of the device, the sensing target includes: a slit body coupled to one side of the rod housing and extending in a longitudinal direction thereof, wherein the slit body is disposed on an outer circumferential face of the housing; and a plurality of protrusions protruding from an outer circumferential face of the slit body and arranged along the longitudinal direction of the slit body.

In one implementation of the device, the sensing target faces toward a front face or a side face of each the protrusion.

Further, the present disclosure provides a vacuum circuit breaker comprising: a vacuum interrupter having: a fixed electrode fixedly disposed in an insulating container and having a fixed contact at one end thereof; and a movable electrode having a movable contact at one end thereof, wherein the movable contact is in contact with or is removed from the fixed contact, wherein the movable electrode received in the insulating container so that the movable electrode ascends or descends; a main circuit having a housing receiving therein the vacuum interrupter; a push rod assembly including: a push rod coupled to an opposite end of the movable electrode to raise up or lower down the movable electrode; and a rod housing for accommodating therein one end of the push rod; and a movement sensing device including: a sensor module installed to be spaced apart from the push rod assembly and disposed to face toward one side of the rod housing; and a sensing target disposed on one side of the push rod assembly and facing toward the sensor module, wherein the sensor module detects movement of the sensing target.

In one implementation of the circuit breaker, the sensing target includes: a slit body coupled to one side of the rod housing and extending in a longitudinal direction thereof; a slit plate protruding outwardly from an outer face of the slit body and extending in the longitudinal direction of the slit body; and a plurality of sensed slits extending through the slit plate.

In one implementation of the circuit breaker, the sensor module includes: a light-emitter facing toward the slit plate and emitting light toward the slit plate; a light-receiver disposed adjacent to the light-emitter and receiving light reflected from the slit plate; and a circuit coupled to the light-emitter and the light-receiver, and outputting an output signal based on an amount of light received by the light-receiver.

In one implementation of the circuit breaker, the sensing target includes: a slit body coupled to one side of the rod housing and extending in a longitudinal direction thereof, wherein the slit body is inserted into the rod housing or is disposed on an outer circumferential face of the rod housing; and a plurality of protrusions protruding from an outer circumferential face of the body and arranged along the longitudinal direction of the body.

In one implementation of the circuit breaker, the sensing target faces toward a front face or a side face of each the protrusion.

The movement sensing device for the vacuum circuit breaker according to the present disclosure and the vacuum circuit breaker having the same may detect movement characteristics of the movable contact, and thus may detect abnormal operation or performance degradation of the vacuum circuit breaker, based on the detected movement characteristics.

The above-described effects, and specific effects of the present disclosure as not mentioned above will be described based on specific details for carrying out the disclosure.

DETAILED DESCRIPTION

Figure 1:
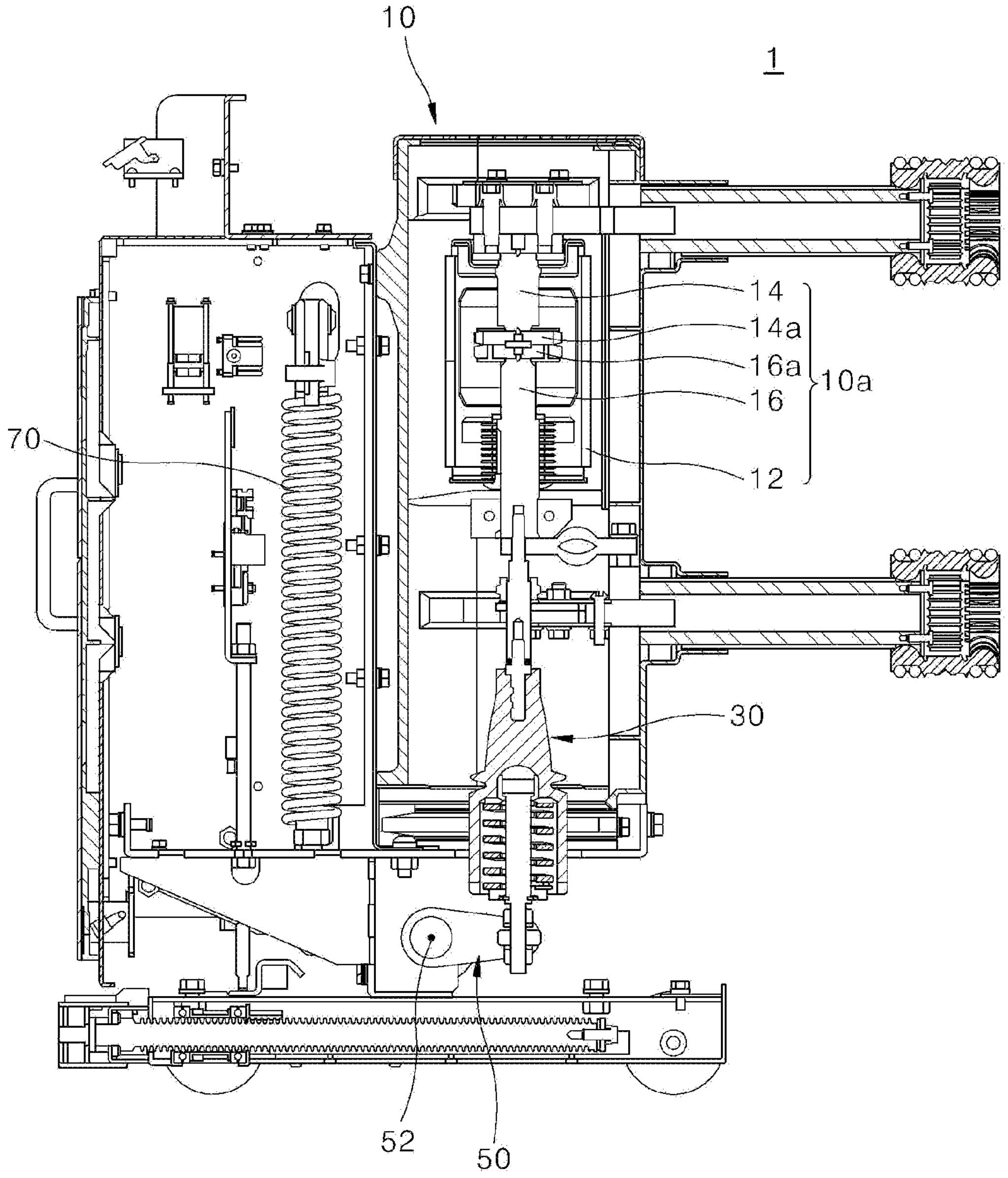
FIG. 1 is a partial cross-sectional view showing a typical vacuum circuit breaker.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a identified component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Figure 2:
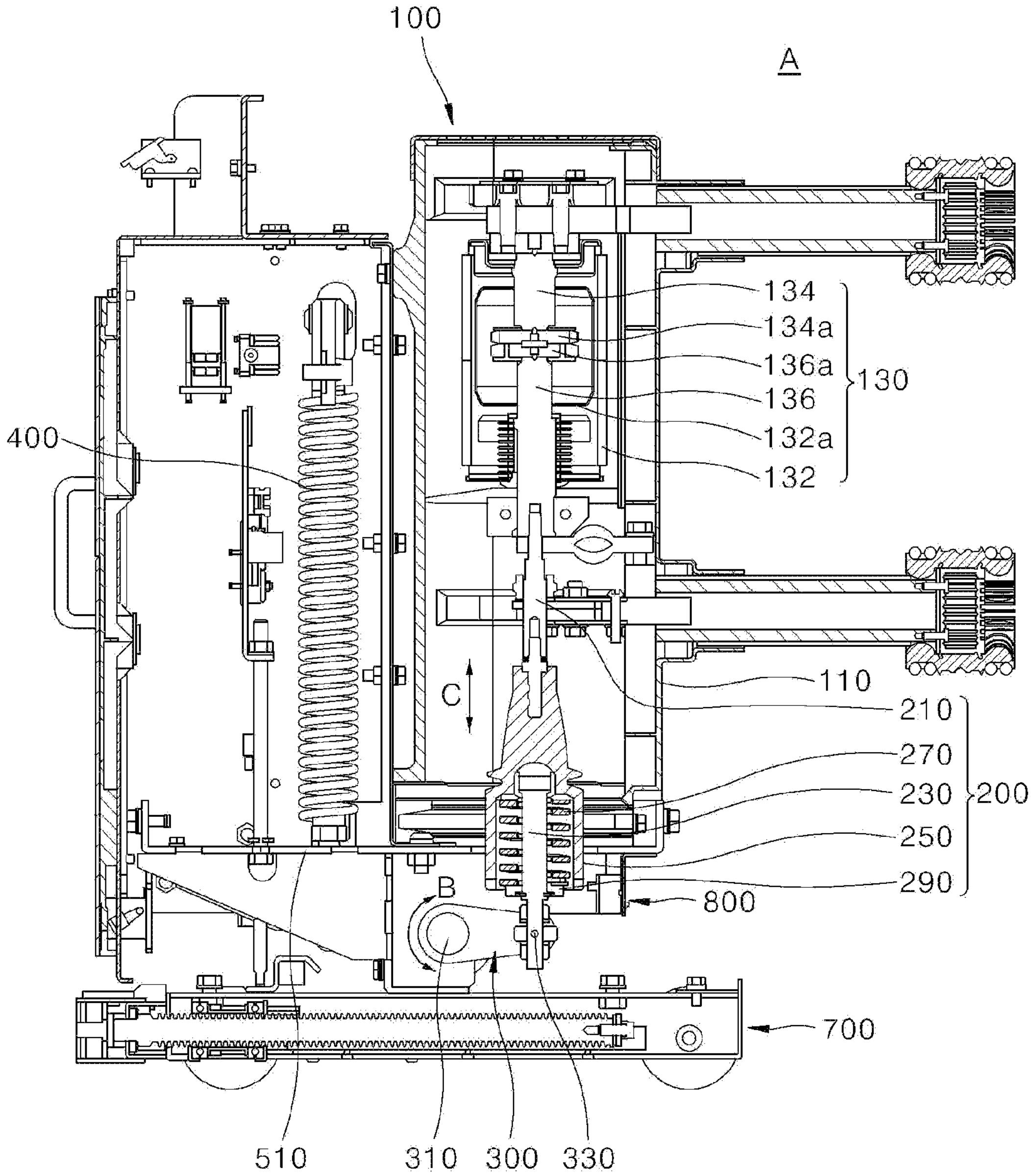
FIG. 2 is a partial cross-sectional view showing a vacuum circuit breaker to which a movement sensing device according to a first embodiment of the present disclosure is applied.
Figure 3:
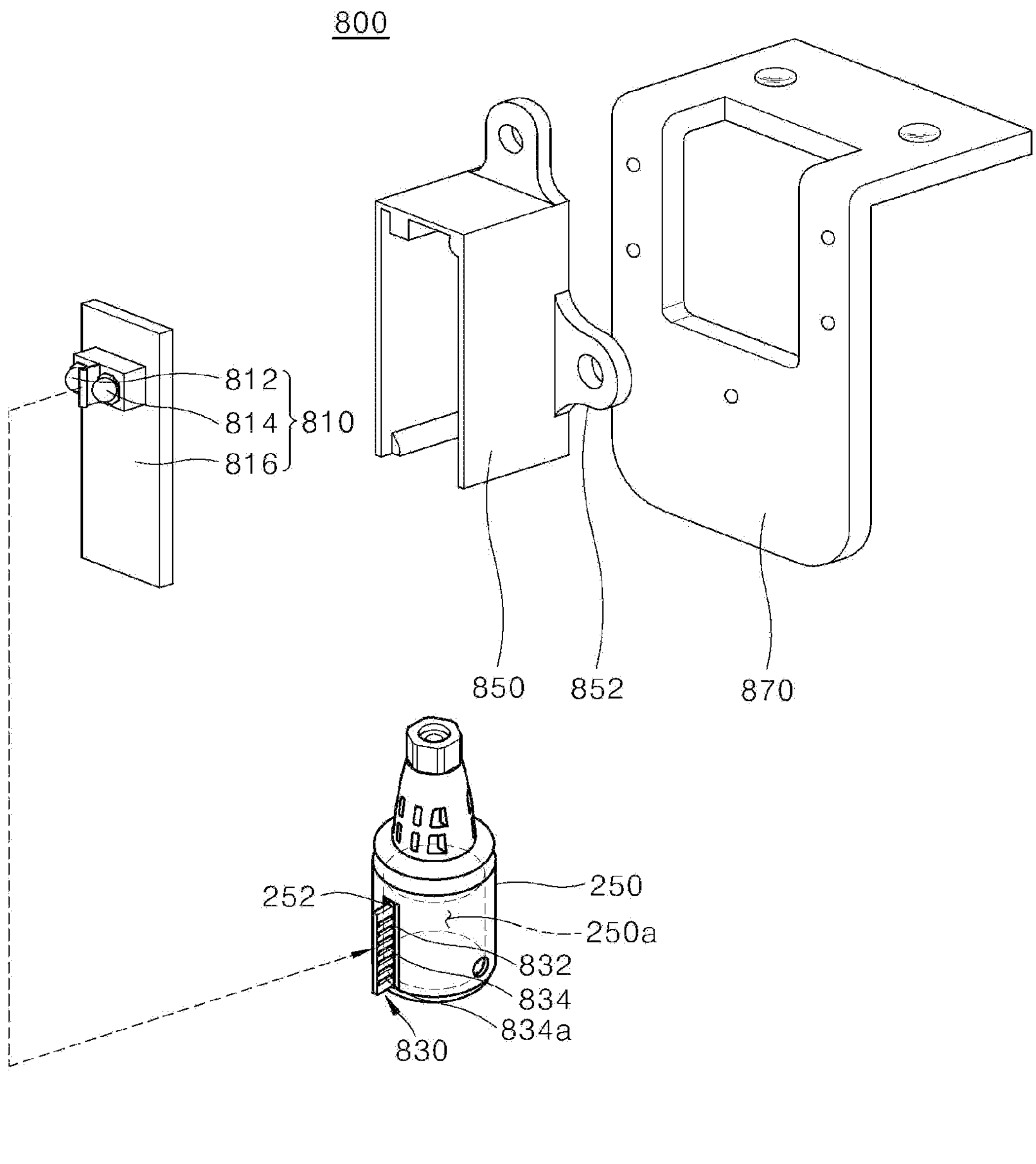
FIG. 3 is an exploded perspective view showing the movement sensing device according to FIG. 2.
Figure 4:
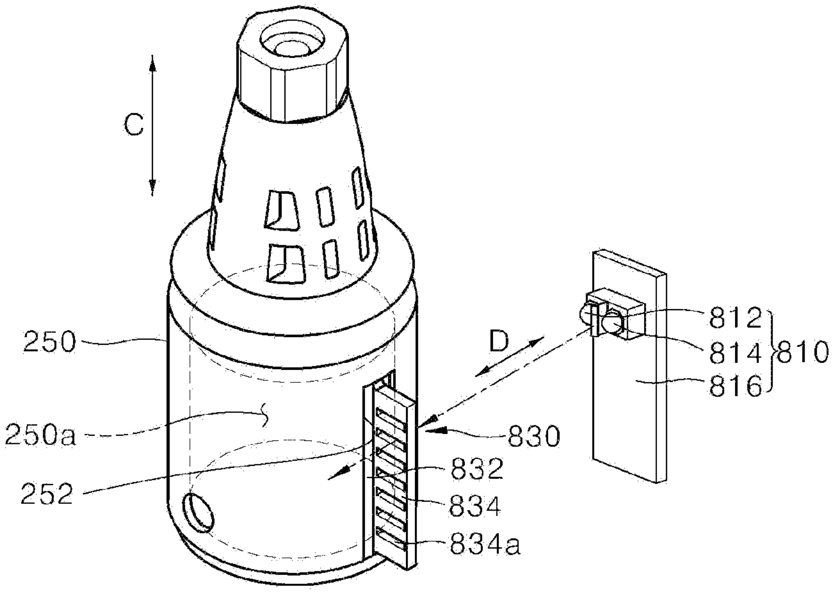
FIG. 4 is an enlarged perspective view showing a sensing target of the movement sensing device according to FIG. 3.
Figure 5:
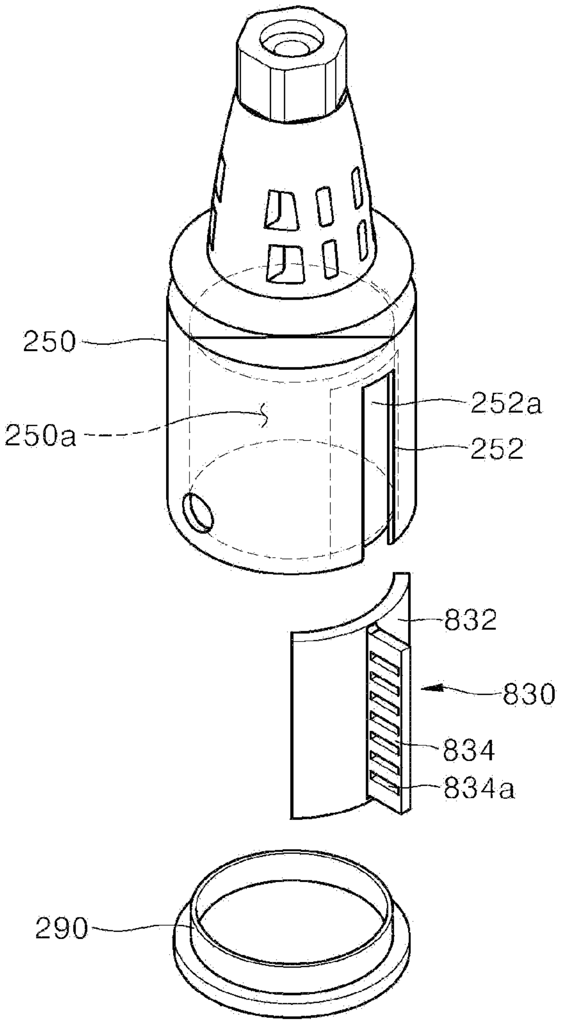
FIG. 5 is an exploded perspective view showing the sensing target according to FIG. 4.
Figure 6:
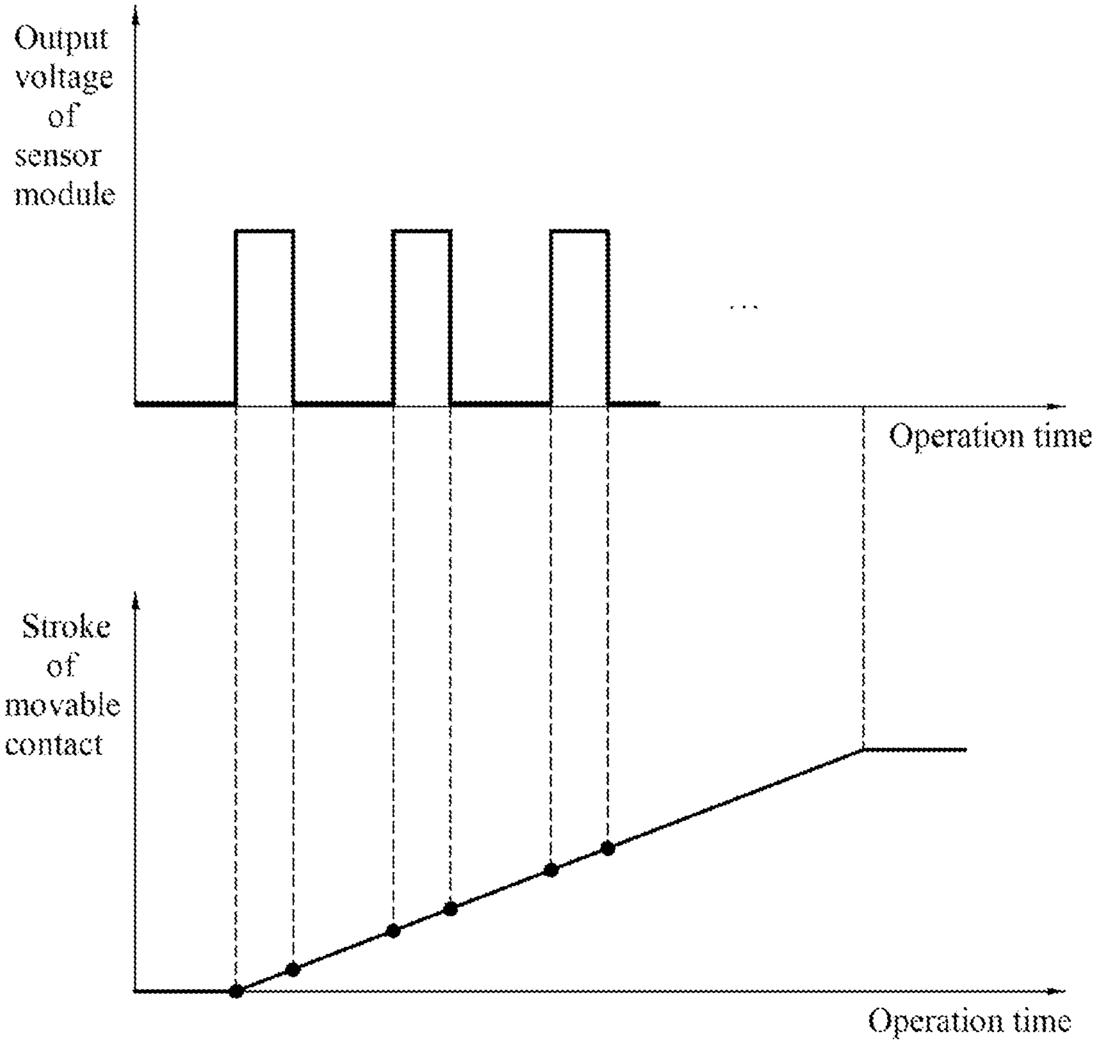
FIG. 6 is a graph showing an output waveform of the movement sensing device according to FIG. 3 and a stroke waveform of the vacuum circuit breaker.

FIG. 2 is a partial cross-sectional view showing a vacuum circuit breaker to which a movement sensing device according to a first embodiment of the present disclosure is applied. FIG. 3 is an exploded perspective view showing the movement sensing device according to FIG. 2. FIG. 4 is an enlarged perspective view showing a sensing target of the movement sensing device according to FIG. 3. FIG. 5 is an exploded perspective view showing the sensing target according to FIG. 4. FIG. 6 is a graph showing an output waveform of the movement sensing device according to FIG. 3 and a stroke waveform of the vacuum circuit breaker.

As shown in FIG. 2, a movement sensing device 800 for a vacuum circuit breaker according to an embodiment of the present disclosure is installed in a location at which the device 800 may check a contact state of a vacuum circuit breaker A to detect contact movement characteristics.

A brief description of main components of the vacuum circuit breaker A is as follows. Hereinafter, only some components of the vacuum circuit breaker related to an embodiment of the present disclosure will be briefly described.

The vacuum circuit breaker A includes a main circuit 100 including a vacuum interrupter 130, a push rod assembly 200 and a main shaft 300 for transmitting power to a contact of the vacuum interrupter 130, and a mechanism assembly 400 that generates a driving force and is connected to the main shaft 300 to deliver the driving force thereto. The components of the vacuum circuit breaker A described above are installed on a track assembly 700.

The main circuit 100 has a housing 110 and the vacuum interrupter 130 installed inside the housing 110. The vacuum interrupter 130 includes an insulating container 132 having a receiving space defined therein, a fixed electrode 134 fixedly received in a upper portion of the insulating container 132, and a fixed contact 134*a* disposed at an end of the fixed electrode 134, a movable electrode 136 installed in a lower portion of the insulating container 132 to be movable up and down, and a movable contact 136*a* disposed at an end of the movable electrode 136. An arc shield 132*a* that creates vacuum is housed inside the insulating container 132. The arc shield 132*a* surrounds the fixed electrode 134 and the fixed contact 134*a*, and the movable electrode 136 and the movable contact 136*a*. The movable contact 136*a* may be brought into in an inserted state in which the movable contact 136*a* comes into contact with the fixed contact 134*a* under movement of the movable electrode 136 or may be brought into a withdrawn state (open state: current blocking state) in which the movable contact 136*a* is spaced from the fixed contact 134*a*. The movable electrode 136 ascends or descends under movement of the push rod assembly 200.

The push rod assembly 200 inserts or withdraws the movable electrode 136. The push rod assembly 200 includes a movable rod 210 connected to the movable electrode 136 and a push rod 230 connected to the main shaft 300, and a rod housing 250 having a top coupled to the movable rod 210 and a bottom coupled to the push rod 230, and an inserting spring 270 which is accommodated inside the rod housing 250 and is compressed by the push rod 230 and or is restored. The main shaft 300 is connected to the bottom of the push rod 230.

The rod housing 250 has an exterior appearance of an approximately cylindrical shape. An upper end of the rod housing 250 to which the movable rod 210 is coupled may have a smaller diameter than that of a portion of the rod housing in which the inserting spring 270 is accommodated. A lower end of the rod housing 250 is open. A cylindrical receiving space is defined in the rod housing therein. The inserting spring 270 is inserted inside the receiving space of the rod housing 250. The push rod 230 supports the inserting spring 270 such that the spring is not removed from the rod housing, and one end of the push rod is fixedly disposed inside the receiving space.

The rod housing 250 may have a coupling structure to which a sensing target 830 corresponding to a sensor module 810 to be described later is coupled. This will be described later.

The main shaft 300 is connected to the mechanism assembly 400 and transmits the power generated from the mechanism assembly 400 to the push rod assembly 200. The main shaft 300 may have a plate shape with a predefined area. One end of the main shaft 300 is pivotally coupled to a bottom of a power transmission structure of the mechanism assembly 400. The opposite end of the main shaft 300 is coupled to the push rod 230. The main shaft 300 may have a shape decreasing in size as it extends from one end coupled to the mechanism assembly 400 to the opposite end coupled to the push rod 230. That is, as shown in FIG. 2, the main shaft 300 may have a similar shape such as a water droplet shape with a larger diameter at one side thereof than that at the opposite side thereof. One end of the main shaft 300 coupled to the mechanism assembly 400 is defined as a first rotatable portion 310, and the opposite end thereof is defined as a second rotatable portion 330.

The main shaft 300 may be pivotally coupled to a drive link not shown in the drawing. The main shaft 300 is exposed out of a lower bracket 510 of the mechanism assembly 400. The first rotatable portion 310 of the main shaft 300 rotates clockwise or counterclockwise along an arrow direction B under the driving force transmitted from the mechanism assembly 400.

When the first rotatable portion 310 rotates counterclockwise, the second rotatable portion 330 rises up along an arrow direction C. When the push rod 230 rises up, the inserting spring 270 is compressed such that the push rod 230 pushes up the movable rod 210. When the movable rod 210 rises up, the movable contact 136*a* rises up and becomes an inserted state in which the movable contact contacts the fixed contact 134*a*.

Conversely, when the first rotatable portion 310 rotates clockwise, the second rotatable portion 330 descends along the arrow direction C. When the push rod 230 descends, the inserting spring 270 is restored and the push rod 230 descends to its original position. When the movable rod 210 descends, the movable contact 136*a* descends and becomes an open or withdrawn state in which the movable contact is removed from the fixed contact 134*a*.

As described above, when the movable rod 210 is raised or lowered by raising or lowering the push rod 230, the movable contact 136*a* contacts or is removed from the fixed contact 134*a*. When the push rod 230 ascends, the rod housing 250 ascends together with the push rod. The rod housing 250 is a relatively accessible part compared to the push rod 230.

Therefore, in accordance with the present disclosure, the movement sensing device 800 is installed on the rod housing 250 and a portion adjacent thereto to detect a movement state of the push rod 230. Accordingly, the device 800 may detect the inserted or withdrawn timing of the movable contact 136*a* and thus determine whether there is an abnormal operation or performance degradation of the breaker based on the detection result.

As shown in FIG. 3 to FIG. 5, the movement sensing device 800 includes the sensor module 810 for sensing the movement of the push rod 230, and a sensing target 830 formed on the rod housing 250 to allow the sensor module 810 to sense the movement of the push rod 230. The movement sensing device 800 may further include brackets 850 and 870 for installing the sensor module 810. Each of the brackets 850 and 870 is not limited in shape as long as the bracket couples the sensor module 810 to the housing 110 of the vacuum circuit breaker A.

The sensor module 810 includes a light-emitter 812 that emits light, a light-receiver 814 that receives the light emitting from the light-emitter 812, and a circuit 816 that controls the light-emitter 812 and the light-receiver 814 and processes a signal.

The light-emitter 812 and the light-receiver 814 are installed side by side and on one side of the circuit 816. The sensor module 810 is also installed such that the light-emitter 812 and the light-receiver 814 face toward the rod housing 250.

The light-emitter 812 of the sensor module 810 emits light in a direction of an arrow D. The sensor module 810 is configured such that the light-receiver 814 detects light emitting from the light-emitter and then reflected back from the sensing target 830. Therefore, as shown in FIG. 4, the sensor module 810 should be installed in a position where the light-emitter 812 and the light-receiver 814 face toward the push rod assembly 200, and thus the light emits toward and is reflected from the sensing target 830 which will be described later. This will be described later.

Because a photocurrent proportional to light intensity detected by the light-receiver 814 flows in the circuit 816, an amount of the current varies based on an amount of the reflected and returned light. As the amount of the reflected and returned light increases, the amount of the current generated in the circuit 816 increases. The circuit 816 may process the photocurrent and output a current value or a voltage value signal converted from the current value.

The sensor module 810 detects the amount of the light emitting from the light-emitter 812 and reflected from an object and incident onto the light-receiver 814. Thus, the amount of the light emitting from the light-emitter 812 and reflected from the sensing target and incident onto the light-receiver 814 decreases as a distance between the sensor module 810 and the object increases. Thus, when the amount of the light incident on the light-receiver 814 decreases, the amount of the photocurrent decreases. Thus, the distance the object and the sensor module 810 may be detected based on the current amount.

Further, when the amount of the reflected light incident on the light-receiver 814 is zero, the photocurrent value becomes 0. Therefore, the device 800 may use the sensor module 810 to determine whether there is an object at a sensed position.

Therefore, a direction in which the sensor module 810 emits light, and then the light is reflected becomes a sensing direction. The sensor module 810 may detect a displacement in the same direction as the sensing direction.

The distance between the sensor module 810 and a sensing target or whether the sensing target is present at a target position may be determined using a separate processing device (not shown). The processing device may be implemented as a device that may process and analyze a signal from the circuit 816, such as a separately installed controller, a user terminal, or an external server. The circuit 816 may transmit the processed current value to the processing device or convert the current value into the voltage value and transmit the voltage thereto. Alternatively, the circuit 816 may send the current value to the processing device which in turn may converting the current value to the voltage value. Then, the processing device may determine presence or absence of the sensing target.

In this embodiment, the light-emitter 812 emits light to the sensing target 830, and then the emitting light is reflected from the sensing target 830 and is then incident on the light-receiver 814. That is, the sensor module 810 is associated with the sensing target 830.

The sensing target 830 includes a slit body 832 disposed on an outer circumferential face of the rod housing 250, a slit plate 834 formed on the slit body 832, and a plurality of sensed slit 834*a* formed in the slit plate 834. The slit body 832 may be removably coupled to or fixed to the rod housing 250. The sensing target 830 reflects the light emitting from the sensor module 810. Therefore, as shown in FIG. 4, the sensing target 830 should be installed on the rod housing such that the sensing target faces toward the light-emitter 812 and light-receiver 814 of the sensor module 810. In more detail, the light-emitter 812 and the light-receiver 814 of the sensor module 810 face toward a plate surface of the slit plate 834.

The slit body 832 has a plate shape with a predefined thickness and a predefined length, and is inserted into the rod housing 250. The slit plate 834 having the sensed slits 834*a* defined therein protrudes from the slit body 832. That is, a combination of the slit body 832 and the slit plate 834 has an approximately 'T' shape. Therefore, in a state where the slit body 832 is coupled to the rod housing 250, only the slit plate 834 protrudes from an outer face of the rod housing 250.

To this end, the slit body 832 may have a curved shape to have a curvature corresponding to a curvature of the rod housing 250. That is, the slit body 832 may have a streamline shaped cross-section. Each of an inner circumferential face and an outer circumferential face of the slit body may have a curvature corresponding to a curvature of the rod housing 250.

Because the slit body 832 has a thickness, a thickness of the rod housing 250 may have a thickness sufficient to allow the slit body 832 to be sufficiently inserted herein. The slit plate 834 protrudes from an outer circumferential face of the slit body 832 and along a length direction thereof.

The slit plate 834 has a bar shape protruding outwards and in a vertical direction and from the outer circumferential face of the slit body 832. The plurality of sensed slits 834*a* extend through a plate face of the slit plate 834 and are arranged along a longitudinal direction of the plate.

The sensed slit 834*a* includes a plurality of horizontal slits with reference to FIG. 5. The sensed slits 834*a* extends through the slit plate 834 and are arranged and spaced from each other by an equal spacing. In this embodiment, a spacing between the sensed slits 834*a* (in the longitudinal direction of the slit plate) may be larger than a width of the sensed slit 834*a* (in the longitudinal direction of the slit plate).

When the light emitting from the light-emitter 812 meets the slit plate 834 and then is reflected therefrom and then is incident onto the light-receiver 814. When the light meets the sensed slit 834*a*, the light passes through the sensed slit 834*a*. Accordingly, signals generated in the circuit 816 in the former and latter cases are different from each other. This will be described later.

In one example, a coupling structure for coupling the sensing target 830 to the rod housing is formed at the rod housing 250.

As shown in FIG. 5, a portion of the rod housing 250 corresponding to a receiving space (hereinafter, a spring receiving space) is cut away to form a receiving slit 252. The slit body 832 of the sensing target 830 is inserted into the receiving slit 252. The inserting spring 270 and the push rod 230 are combined with each other while the slit body 832 is coupled to the receiving slit 252. While all of the slit body 832, the inserting spring 270 and the push rod 230 are coupled to the rod housing 250, a fixing portion 290 is coupled thereto prevent separation of the slit body 832 from the housing.

The receiving slit 252 extends along a longitudinal direction of the push rod 230 and through a wall of the rod housing 250. That is, the receiving slit 252 is formed between the inner circumferential face and the outer circumferential face of the rod housing 250 and in the spring receiving space 250*a*. The receiving slit 252 has a shape and a size corresponding to those of the slit body 832 so that the slit body 832 may be inserted into the slit 252.

One end of the receiving slit 252 is open and is in communication with an open end of the spring receiving space 250*a*. The opposite end of the receiving slit 252 contacts one end of the slit body 832 to block the movement of the slit body 832.

Further, in an area of the receiving slit 252, a slit hole 252*a* is cut away to expose the slit plate 834 out of the rod housing 250. The slit hole 252*a* has a length enough to expose the slit plate 834.

Using the above structure, the slit body 832 is inserted from the open end of the receiving slit 252 and upwards and along a length direction, and then is fixed by the fixing portion 290. At this time, the slit plate 834 is in an exposed state out of the slit hole 252*a*.

The inserting spring 270 and the push rod 230 are combined to each other and inserted into the rod housing while the slit body 832 is inserted into the receiving slit 252. Then, the fixing portion 290 is inserted and fixed to the rod housing 250. The fixing portion 290 has a stopper structure having a ring-shaped hollow body, and a portion protruding from the body and inserted into the spring receiving space 250*a*. It is desirable that the hollow is sized such that the fixing portion does not interfere with the movement of the push rod 230. The fixing portion 290 is coupled to the rod housing 250 to prevent the slit body 832 from being removed from and out of the receiving slit 252.

The protrusion of the fixing portion 290 may have a predefined thickness and may have an outer diameter corresponding to an inner diameter of the rod housing 250.

A detailed description of a method for sensing and monitoring contact movement characteristics using the movement sensing device for the vacuum circuit breaker according to an embodiment of the present disclosure having the above configuration is as follows.

When the push rod 230 rises up toward a top of FIG. 2 under movement of the main shaft 300, the sensor module 810 detects a position of the sensing target 830 mounted on the rod housing 250 and indirectly detects the position of the push rod 230.

The light-emitter 812 of the sensor module 810 emits light continuously. The sensing target 830 present in the sensing direction of the emitting light has the sensed slit 834*a*, and thus the light is reflected from the slit plate or transmits through the sensed slit.

When the rod housing 250 rises up due to a vertical level increase of the push rod 230, the light may sequentially meet a topmost sensed slit 834*a*, a next topmost sensed slit 834*a*, and so on defined in the slit plate 834. The sensed slit 834*a* transmits light therethrough. A portion of the slit plate 834 between the sensed slit 834*a* blocks light so that the light is reflected therefrom. Therefore, while the rod housing 250 is rising up, the passing-through and blocking of the light emitting from the light-emitter 812 are sequentially repeated. Thus, a graph shown in FIG. 6 is derived.

As shown in FIG. 6, when the light emitting from the light-emitter 812 is blocked by the plate surface of the slit plate 834, the light is reflected therefrom and incident on the light-receiver 814 of the sensor module 810. Therefore, an output voltage of the sensor module 810 is maintained at a constant value while the light is reflected therefrom. When the light emitting from the light-emitter 812 passes through the surface of the slit plate 834 and reaches the sensed slit 834*a*, the light passes through the sensed slit 834*a*. Therefore, no light is reflected and incident to the light-receiver 814, so that the output voltage of the sensor module 810 becomes zero. While the light transmits through the slit, the output voltage of sensor module 810 continues to be zero.

Because the sensed slits 834*a* are arranged in the slit plate 834 and spaced from each other by a regular spacing, a section in which the output voltage is a constant non-zero value and a section in which the output voltage is zero are alternatively repeated. Therefore, the output voltage of sensor module 810 is shown as an upper graph form of FIG. 6.

The push rod 230 moves by the main shaft 300, and the movable electrode 136 moves by the push rod 230. The movable contact 136*a* is disposed at an end of the movable electrode 136. Thus, the movement of the main shaft 300 is associated with the movement of the movable electrode 136. Therefore, a stroke graph (a lower graph of FIG. 7) of the movable contact 136*a* may be obtained based on an output voltage waveform graph of the sensor module 810 and the spacing between the sensed slits 834*a*. The stroke of the movable contact 136*a* means a speed when the movable contact 136*a* hits the fixed contact 134*a*.

Thus, the movement characteristics of the movable contact 136*a* may be monitored in a normal operation state. When a graph different from that of the normal operation state is derived, the controller or the user may determine a current situation as a problematic situation such as a contact error.

In an event of malfunction or performance degradation of the main shaft 300, the push rod 230, or the movable contact 136*a*, an output voltage waveform interval over an operation time of the sensor module 810 or a slope of a stroke graph of the movable contact 136*a* is different from a graph in a normal situation. Therefore, the movement sensing device

800 according to the present disclosure may be used to detect an abnormal movement or performance degradation of the main shaft 300 or the push rod 230 and the movable contact 136*a*.

The sensor module 810 may operate to continuously monitor the movement of the sensing target 830, or may operate only in the contact closed or inserted state.

In the above-described embodiment, a structure in which both the light-emitter 812 and the light-receiver 814 of the sensor module 810 are installed on the circuit 816, and face toward the sensing target 830 has been described. However, in another example, the light-emitter 812 and the light-receiver 814 may be disposed to face toward each other while the sensing target 830 is interposed therebetween.

In the above-described embodiment, an example in which the sensing target has the slits has been described. However, the sensing target may be implemented in a different form. Detailed descriptions of the same component or configuration as that of the above-described embodiment will be omitted.

Figure 7:
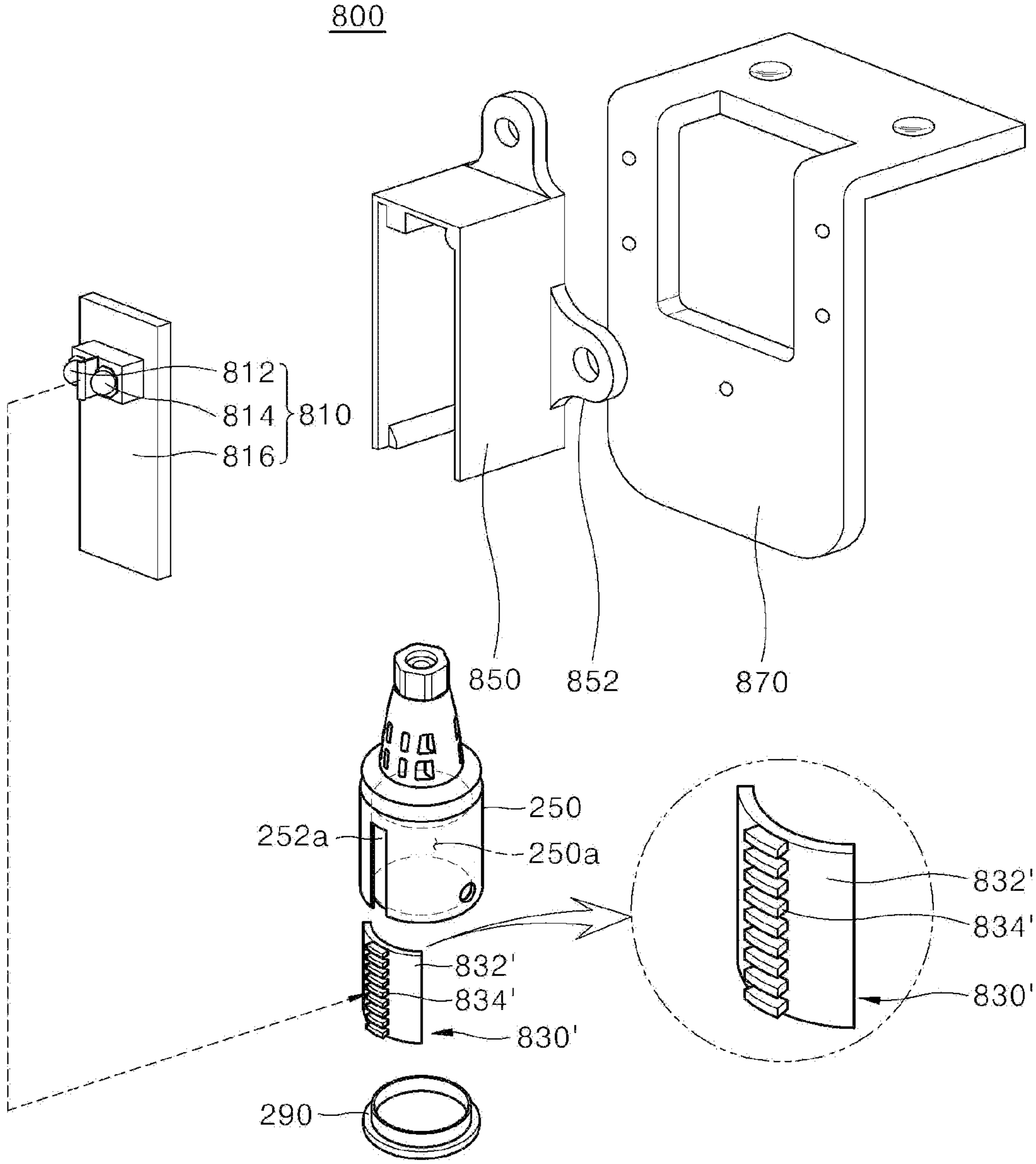
FIG. 7 is an exploded perspective view showing a movement sensing device in accordance with a second embodiment of the present disclosure.
Figure 8:
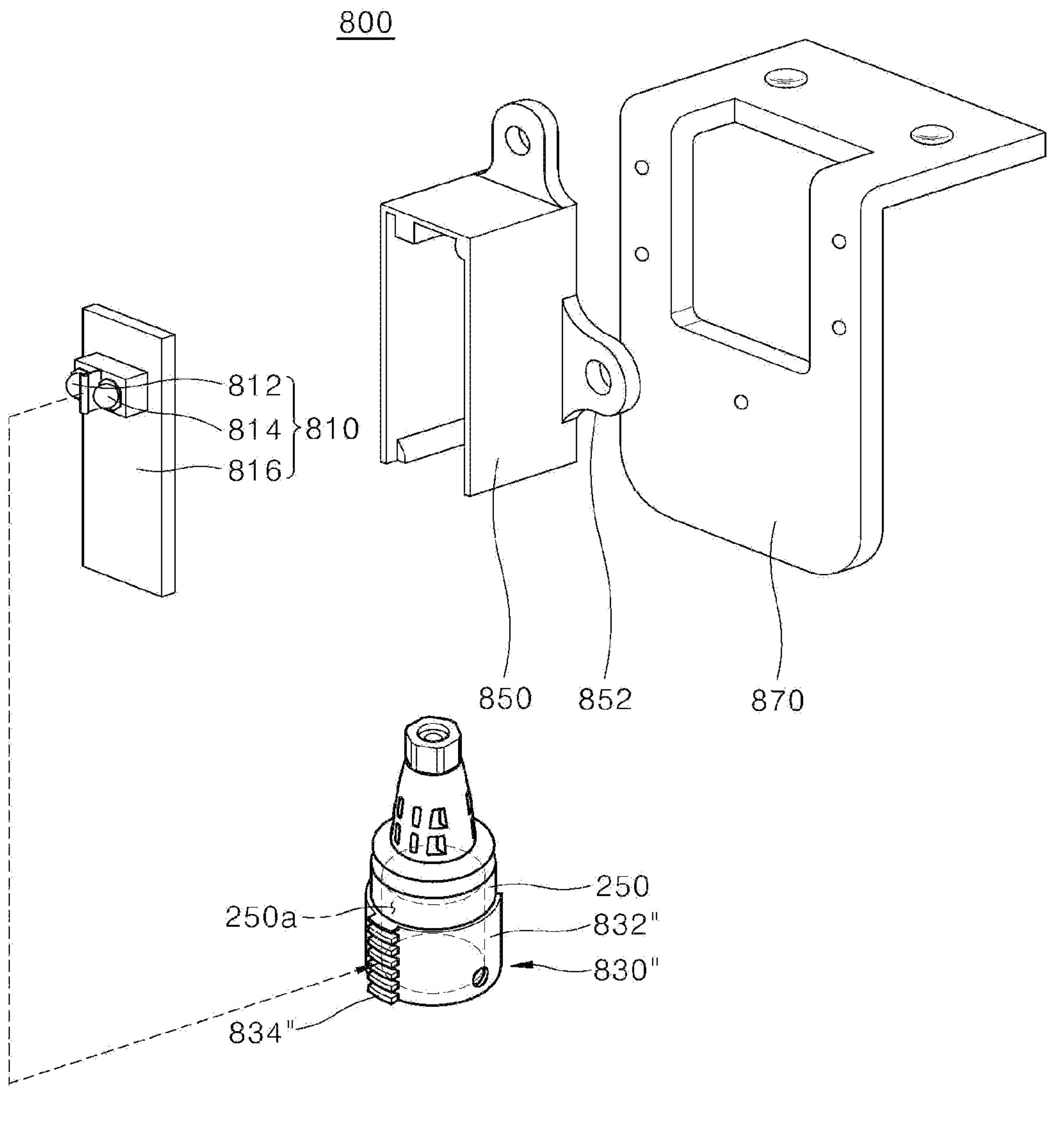
FIG. 8 is an exploded perspective view showing a movement sensing device according to a third embodiment of the present disclosure.
Figure 9:
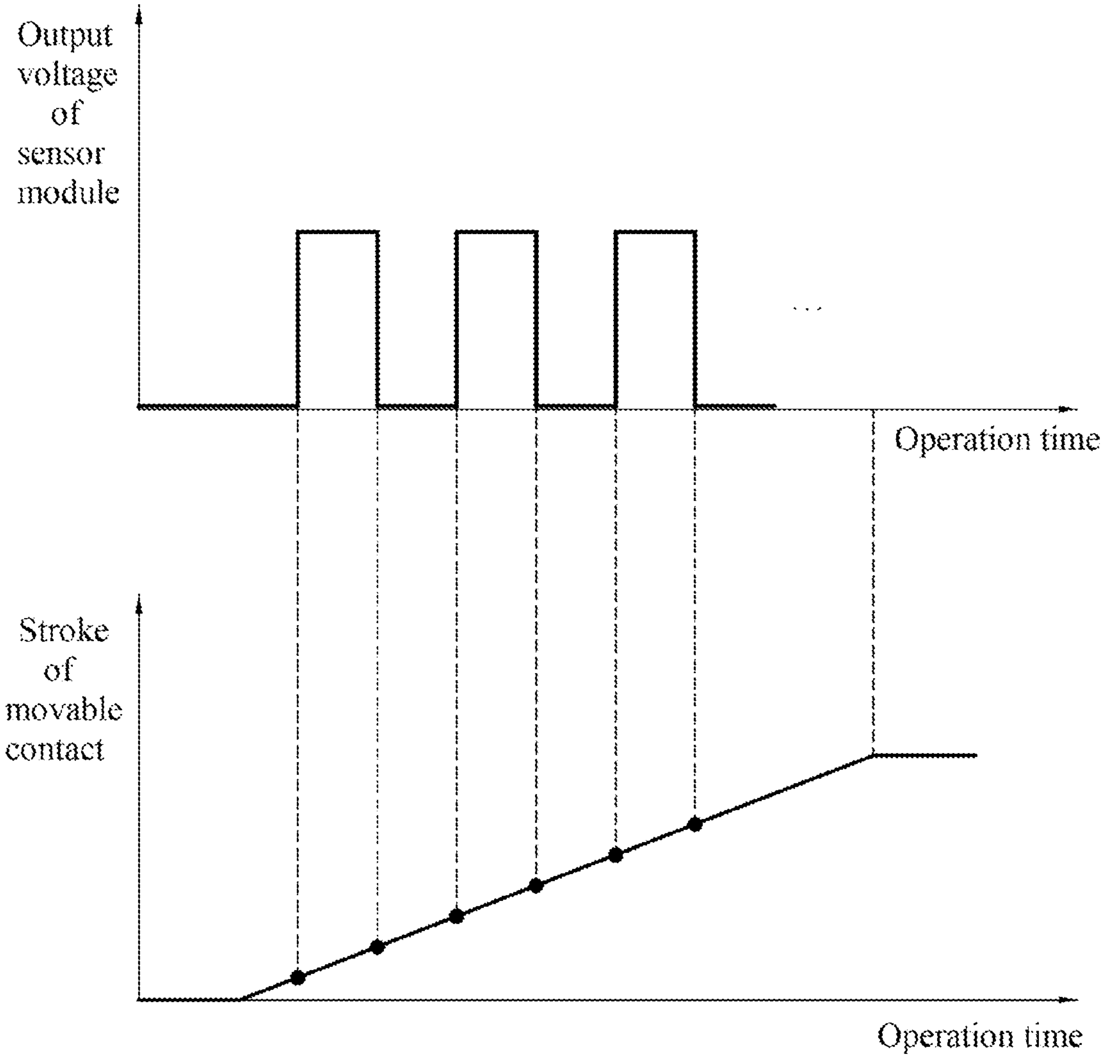
FIG. 9 is a graph showing an output waveform of each of the movement sensing devices according to FIG. 7 and FIG. 8 and a stroke waveform of the vacuum circuit breaker.

FIG. 7 is an exploded perspective view showing a movement sensing device in accordance with a second embodiment of the present disclosure. FIG. 8 is an exploded perspective view showing a movement sensing device according to a third embodiment of the present disclosure. FIG. 9 is a graph showing an output waveform of each of the movement sensing devices according to FIG. 7 and FIG. 8 and a stroke waveform of the vacuum circuit breaker.

As shown in FIG. 7, another movement sensing device 800 according to the second embodiment of the present disclosure includes the sensor module 810 identical with that of the first embodiment, and a sensing target 830'. The sensing target 830' has a body 832' and protrusions 834'.

The body 832' has the same shape as the slit body 832 of the first embodiment, and has a plate shape having the same curvature as the curvature of the outer circumferential face of the rod housing 250. The plurality of protrusions 834' protrude from an outer circumferential face of the body 832' and arranged along the longitudinal direction of a slit hole 252*a*.

The protrusion 834' may protrude from an outer face of the body 832' and may be formed in a form of a cuboid or a cube. The protrusion 834' has a predefined size. The plurality of protrusions are arranged and spaced from each other by a preset spacing.

As in the first embodiment, the body 832' is inserted into the slit hole 252*a* of the receiving slit, and the protrusions 834' protrude out of the slit hole 252*a*.

Alternatively, as shown in FIG. 8, a body 832" may surround an outer circumferential face of the rod housing 250 and extend in a vertical direction. In this case, the body 832" is not inserted into the receiving slit 252 of the rod housing 250, but is coupled to an outer circumferential face of the rod housing 250. Therefore, the rod housing 250 is free of the receiving slit 252. In this connection, a protrusion 834" may have the same structure as that of the second embodiment.

The sensor module 810 faces toward the sensing target 830' or 830" according to the second or third embodiment of the present disclosure as shown in FIG. 4, and more specifically, faces a side face of the protrusion 834' or 834".

In the sensing targets 830' and 830" according to the second and third embodiments of the present disclosure, light may pass through a space between the protrusions 834' and a space between the protrusions 834". The protrusions 834' and 834" may block the light and thus, the light may be reflected therefrom. Therefore, while the rod housing 250 rises up, the passing-through and blocking of the light emitting from the light-emitter 812 are alternately repeated. Thus, a graph shown in FIG. 9 is derived.

Therefore, in a similar manner to the first embodiment, the movement sensing device according to each of the second and third embodiment may detect movement abnormality or performance degradation of the main shaft 300, the push rod 230, and the movable contact 136*a*.

Alternatively, although not shown in the drawings, the sensor module 810 faces toward the sensing target 830' or 830" according to the second or third embodiment of the present disclosure and faces a front face of the protrusion 834' or 834". In this connection, a difference between a sensed value detected by the sensor module 810 based on a distance thereof to the protrusion 834' or 834" and a sensed value detected by the sensor module 810 based on a distance thereof to a space between the protrusions 834' or a space between the protrusions 834" may occur. In other words, the distance between the space between the protrusions 834' or the space between the protrusions 834" and the sensor module 810 larger than the distance between the sensor module 810 and the protrusion 834' or 834". Thus, the sensed value detected by the sensor module 810 based on the distance thereof to the protrusion 834' or 834" may be greater than the sensed value detected by the sensor module 810 based on the distance thereof to the space between the protrusions 834' or the space between the protrusions 834". Therefore, in a similar manner to the first embodiment, the movement sensing device according to each of the second and third embodiment may detect movement abnormality or performance degradation of the main shaft 300, the push rod 230, and the movable contact 136*a*.

The present disclosure as described above may be subjected to various substitutions, modifications and changes within the scope that does not depart from the technical spirit of the present disclosure by those of ordinary skill in the technical field to which the present disclosure belongs. Thus, the present disclosure is not limited to the above-described embodiments and the attached drawings.

What is claimed is:

1. A movement sensing device for a vacuum circuit breaker, wherein the vacuum circuit breaker includes a push rod assembly coupled to a movable electrode of a vacuum interrupter to raise up or lower down the movable electrode, wherein the movement sensing device comprises:
- a sensor module spaced apart from the push rod assembly and facing toward one side of a rod housing; and
- a sensing target disposed on one side of the push rod assembly and facing toward the sensor module, wherein the sensing target includes:
  - a slit body coupled along a longitudinal direction to one side of the rod housing;
    - a slit plate protruding outwardly along a longitudinal direction from an outer face of the slit body; and
  - a plurality of sensed slits passing through the slit plate.

2. The device of claim 1, wherein the sensing target is disposed in a direction facing toward a plate face of the slit plate.

3. The device of claim 1, wherein the sensed slits are formed and spaced from each other by a preset spacing along a longitudinal direction of the slit plate.

4. The device of claim 1, wherein the slit body has a curved shape having a curvature corresponding to a curvature of an outer circumferential face of the rod housing.

5. The device of claim 4, wherein the slit body is inserted into an inner side of the rod housing, wherein while the slit body inserted into the rod housing, the slit plate protrudes out of the rod housing.

6. The device of claim 5, wherein the rod housing includes:

a receiving slit extending through one portion of an outer circumferential face of the rod housing, wherein the receiving slit forms along a longitudinal direction of the rod housing, and has one open end in communication with an open end of the rod housing, wherein the slit body is inserted into the receiving slit; and a slit hole partially overlapping the receiving slit, wherein the slit hole is cut away along a longitudinal direction of the receiving slit, wherein the slit plate is exposed through the slit hole.

7. The device of claim 6, wherein a length of the receiving slit is larger than a length of the slit body.

8. The device of claim 6, wherein the push rod assembly further includes a fixing portion coupled to the open end of the rod housing to block the open end of the receiving slit, wherein the fixing portion has a hollow ring-shape such that the push rod is inserted into the fixing portion.

9. The device of claim 1, wherein the sensor module includes:

a light-emitter facing toward the slit plate and emitting light toward the slit plate;

a light-receiver disposed adjacent to the light-emitter and receiving light reflected from the slit plate; and a circuit coupled to the light-emitter and the light-receiver, and outputting an output signal based on an amount of light received by the light-receiver.

10. The device of claim 1, wherein the sensing target includes:

a slit body coupled to one side of the rod housing and extending in a longitudinal direction thereof, wherein the slit body is inserted into the rod housing; and a plurality of protrusions protruding from an outer circumferential face of the slit body and arranged along the longitudinal direction of the slit body.

11. The device of claim 10, wherein the sensing target faces toward a front face or a side face of each the protrusion.

12. The device of claim 1, wherein the sensing target includes:

a slit body coupled to one side of the rod housing and extending in a longitudinal direction thereof, wherein the slit body is disposed on an outer circumferential face of the rod housing; and a plurality of protrusions protruding from an outer circumferential face of the slit body and arranged along the longitudinal direction of the slit body.

13. A vacuum circuit breaker comprising:

a vacuum interrupter having:

a fixed electrode fixedly disposed in an insulating container and having a fixed contact at one end thereof; and a movable electrode having a movable contact at one end thereof, wherein the movable contact is in contact with or is removed from the fixed contact, wherein the movable electrode received in the insulating container so that the movable electrode ascends or descends;

a main circuit having a housing receiving therein the vacuum interrupter;

a push rod assembly including:

a push rod coupled to an opposite end of the movable electrode to raise up or lower down the movable electrode; and a rod housing for accommodating therein one end of the push rod; and a movement sensing device including:

a sensor module installed to be spaced apart from the push rod assembly and disposed to face toward one side of the rod housing; and a sensing target disposed on one side of the push rod assembly and facing toward the sensor module, wherein the sensor module detects movement of the sensing target, wherein the sensing target includes:

a slit body coupled to one side of the rod housing and extending in a longitudinal direction thereof;

a slit plate protruding outwardly from an outer face of the slit body and extending in the longitudinal direction of the slit body; and a plurality of sensed slits extending through the slit plate.

14. The circuit breaker of claim 13, wherein the sensor module includes:

a light-emitter facing toward the slit plate and emitting light toward the slit plate;

a light-receiver disposed adjacent to the light-emitter and receiving light reflected from the slit plate; and a circuit coupled to the light-emitter and the light-receiver, and outputting an output signal based on an amount of light received by the light-receiver.

15. The circuit breaker of claim 13, wherein the sensing target includes:

a slit body coupled to one side of the rod housing and extending in a longitudinal direction thereof, wherein the slit body is inserted into the rod housing or is disposed on an outer circumferential face of the rod housing; and a plurality of protrusions protruding from an outer circumferential face of the body and arranged along the longitudinal direction of the body.

16. The circuit breaker of claim 15, wherein the sensing target faces toward a front face or a side face of each the protrusion.

* * * * *